US007357228B2

(12) United States Patent
Okayama et al.

(10) Patent No.: US 7,357,228 B2

(45) Date of Patent: Apr. 15, 2008

(54) DISK BRAKES WITH NOISE SUPPRESSION FEATURE

(75) Inventors: Katsuya Okayama, Aichi-gun (JP); Hiroyuki Fujikawa, Nagoya (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 167 days.

(21) Appl. No.: 11/248,216

(22) Filed: Oct. 13, 2005

(65) Prior Publication Data

US 2006/0081422 A1 Apr. 20, 2006

(30) Foreign Application Priority Data

Oct. 14, 2004 (JP) ............................ 2004-299796

(51) Int. Cl.
*F16D 69/00* (2006.01)

(52) U.S. Cl. ................................ 188/251 A; 188/73.1

(58) Field of Classification Search ............ 188/250 E, 188/251 A, 251 M, 73.1
See application file for complete search history.

(56) References Cited

U.S. PATENT DOCUMENTS 3,856,120 A * 12/1974 Kwolek et al. ......... 188/251 A
3,939,946 A * 2/1976 Pierre et al. .......... 188/218 XL
4,705,146 A * 11/1987 Tarter ........................ 188/73.1
4,926,978 A * 5/1990 Shibata et al. ............ 188/73.1
5,046,590 A * 9/1991 Trema ....................... 188/72.5
5,509,511 A * 4/1996 Kwolek .................. 188/251 A
5,749,301 A * 5/1998 Wronkiewicz et al. .. 105/199.3
6,032,767 A * 3/2000 Roehling .................. 188/73.1
7,097,009 B2 * 8/2006 Shao et al. ............. 188/251 A
2003/0106749 A1 * 6/2003 Yamaguchi et al. ....... 188/73.1
2004/0084258 A1 * 5/2004 Fujikawa et al. .......... 188/73.1
2006/0081422 A1 * 4/2006 Okayama et al. .......... 188/71.1

FOREIGN PATENT DOCUMENTS

JP 2000-136839 5/2000

* cited by examiner

*Primary Examiner*—Christopher P. Schwartz
(74) *Attorney, Agent, or Firm*—Buchanan Ingersoll & Rooney PC

(57) ABSTRACT

A disk brake has a support member, an inner pad, and an outer pad. The support member is mounted on a car body member at a side near a car body with respect to a disk rotor and straddles the disk rotor in a cantilever manner in a rotor axis direction. The inner pad is movably supported in the rotor axis direction by the support member at a side near the car body with respect to the disk rotor. The outer pad is movably supported in the rotor axis direction by the support member at an outer side of the car body with respect to the disk rotor. The outer pad has a smaller friction coefficient than that of the inner pad, and the braking torque generated between the outer pad and the disk rotor is smaller than the braking torque generated between the inner pad and the disk rotor.

3 Claims, 3 Drawing Sheets

8
4
4d
3b1
3b
3
3a
5
3b1
1
4
4d

DISK BRAKES WITH NOISE SUPPRESSION FEATURE

This application claims priority to Japanese patent application serial number 2004-299796, the contents of which are incorporated herein by reference.

BACKGROUND OF THE INVENTION

1. Field of the Invention

The present invention relates to disk brakes, and in particular to a disk brake having a noise suppression feature to inhibit unusual or uncommon noise generation.

2. Description of the Related Art

A known disk brake has many problems to be solved. One of the problems is unusual noise generated by the braking system. Various measures suppressing unusual or uncommon noise have been applied to the disk brake.

In general, when a disk rotor or a pad is exposed to water, the frictional coefficient between the disk rotor and the pad increases or at least becomes unsteady. As a result, an uncommon noise is generated between the disk rotor and the pad. A known disk brake, as described in Japanese Laid-Open Patent Publication No. 2000-136839, has chamfering or a slit formed on the friction surface of an outer pad. The chamfering or the slit functions to remove the water from between the disk rotor and the pad. Thereby, the unusual noise generated due to the water exposure can be suppressed.

Moreover, in the disk brake the sliding surface of an inner pad may have a larger length in a sliding direction as compared with the outer pad. Thereby, vibration in the disk rotor generated by a high decelerating speed can be strongly suppressed by the inner pad. In addition, a mounting is typically fixed on a car body member in a cantilever manner. The inner pad is supported at the base end side of the mounting. The outer pad is supported at the tip end side of the mounting. Therefore, the inner pad is more stably supported than the outer pad so that the inner pad can reliably suppress the vibration of the disk rotor. As a result, generation of unusual noises can be effectively suppressed.

As shown above, the inner pad can effectively suppress unusual noises that may be generated due to water exposure and high decelerating speeds. However, the noise suppression ability of the outer pad has not been fully addressed by the known disk brakes.

SUMMARY OF THE INVENTION

It is accordingly an object of the present invention to teach a disk brake that can effectively suppress unusual noises generated by the brake by suppressing the vibration acceleration of the outer pad.

According to one aspect of the present teachings, a disk brake may have a support member, an inner pad, and an outer pad. The support member may be mounted to a car body member at a side near the car body with respect to the disk rotor. The support member may straddle the disk rotor in a cantilever manner in a rotor axis direction. The inner pad is movably supported in the rotor axis direction by the support member at a side near the car body with respect to the disk rotor. The support member movably supports the outer pad in the rotor axis direction at an outer side of the car body with respect to the disk rotor. The outer pad may have a smaller friction coefficient than the friction coefficient of the inner pad. Consequently, the braking torque generated between the outer pad and the disk rotor may be smaller than the braking torque generated between the inner pad and the disk rotor.

Therefore, the inventors of the application have found that the unusual noise generated by the brake system can be effectively suppressed according to a configuration determined from experimental results. While the mechanism of suppressing the unusual noise is currently not clearly identified, one possible rationale for the functioning of the suppressing mechanism is considered as follows. In particular, the support member is constructed in a cantilever manner. Therefore, the tip end side of the support member is easily displaced due to vibration of the outer pad supported at the tip end side of the support member. However, since the friction coefficient of the outer pad is smaller than the friction coefficient of the inner pad, the vibration at the side of the outer pad is reduced. As a result, the displacement of the support member is reduced. In addition, the inner pad has a larger friction coefficient than the friction coefficient of the outer pad. Consequently, the inner pad generally suppresses the displacement of the support member. The unusual noise of the brake system otherwise generated at a high decelerating speed can thereby be suppressed.

In another aspect of the present teachings the friction coefficient of the outer pad is preferably at least 7% smaller than the friction coefficient of the inner pad. More preferably, the friction coefficient of the outer pad is at least 14% smaller than the friction coefficient of the inner pad.

In still another aspect of the present teachings, a disk brake may have a disk rotor, a support member, an inner pad, and an outer pad. The support member may be mounted to a car body member at a side near the car body with respect to the disk rotor. The support member straddles the disk rotor in a cantilever manner in a rotor axis direction. The inner pad is movably supported in the rotor axis direction by the support member at a side near the car body with respect to the disk rotor. The outer pad is movably supported in the rotor axis direction by the support member at an outer side of the car body with respect to the disk rotor. The disk rotor has an outer surface that is pressed by the outer pad and an inner surface that is pressed by the inner pad. The outer surface has a smaller friction coefficient than the friction coefficient of the inner surface. Consequently, the braking torque generated between the outer surface and the outer pad is smaller than the braking torque generated between the inner surface and the inner pad.

The inventors of the application have found that the unusual noise of the brake can be effectively suppressed according to a construction determined from experimental results. While the mechanism of suppressing the unusual noise is not clearly understood, one possibility is that the suppression mechanism may be considered to function as follows. The support member is constructed in a cantilever manner. As a result, the tip end side of the support member is easily displaced due to the vibration of the outer pad supported at the tip end side of the support member. However, in the current invention the outer pad slides more easily against the outer surface of the disk rotor than the inner pad slides against the inner surface of the disk rotor. Therefore, the vibration generated between the outer surface and the outer pad is reduced and the corresponding displacement of the support member is also reduced. In addition, the inner surface of the disk rotor has a larger friction coefficient than the friction coefficient of the outer surface. Therefore, the inner pad contacting the inner surface of the disk rotor can effectively suppress the displacement of the support member. Overall, the displacement of the support member is generally suppressed. The unusual noise of the brake system otherwise generated at a high decelerating speed can thereby be suppressed.

In yet another aspect of the present teachings the friction coefficient of the disk rotor's outer surface is preferably at least 10% smaller than the friction coefficient of the disk rotor's inner surface.

DETAILED DESCRIPTION OF THE INVENTION

Each of the additional features and teachings disclosed above and below may be utilized separately or in conjunction with other features and teachings to provide improved disk brakes. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

The inventors of the application have conducted various experiments in an attempt to identify factors causing an unusual noise to be generated at high decelerating speeds. As one result, the inventors have found that the vibration acceleration of the outer pad is larger than the vibration acceleration of the inner pad at high decelerating speeds. The experiments have also confirmed that the vibration acceleration of the outer pad has a large influence on the unusual noise. Consequently, the inventors have developed a disk brake including the following embodiments.

First Representative Embodiment

Figure 1:
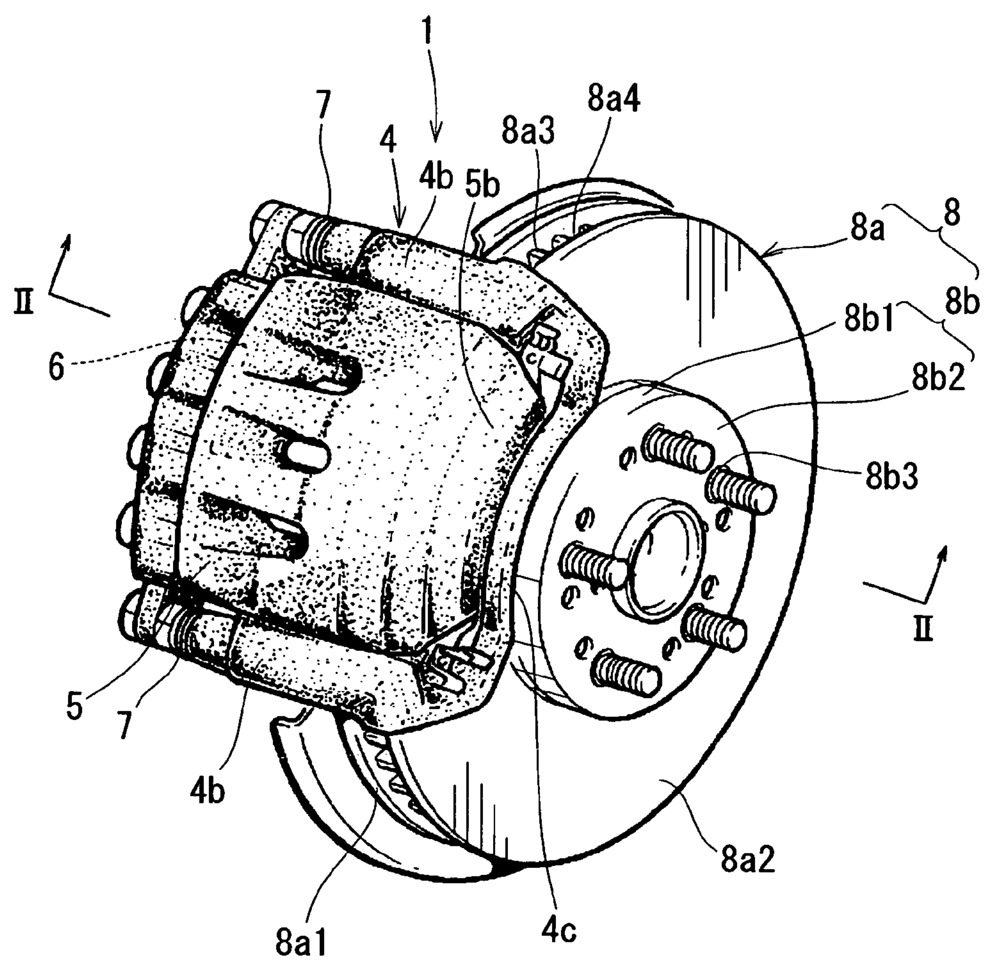
FIG. 1 is a perspective view of a disk brake.
Figure 2:
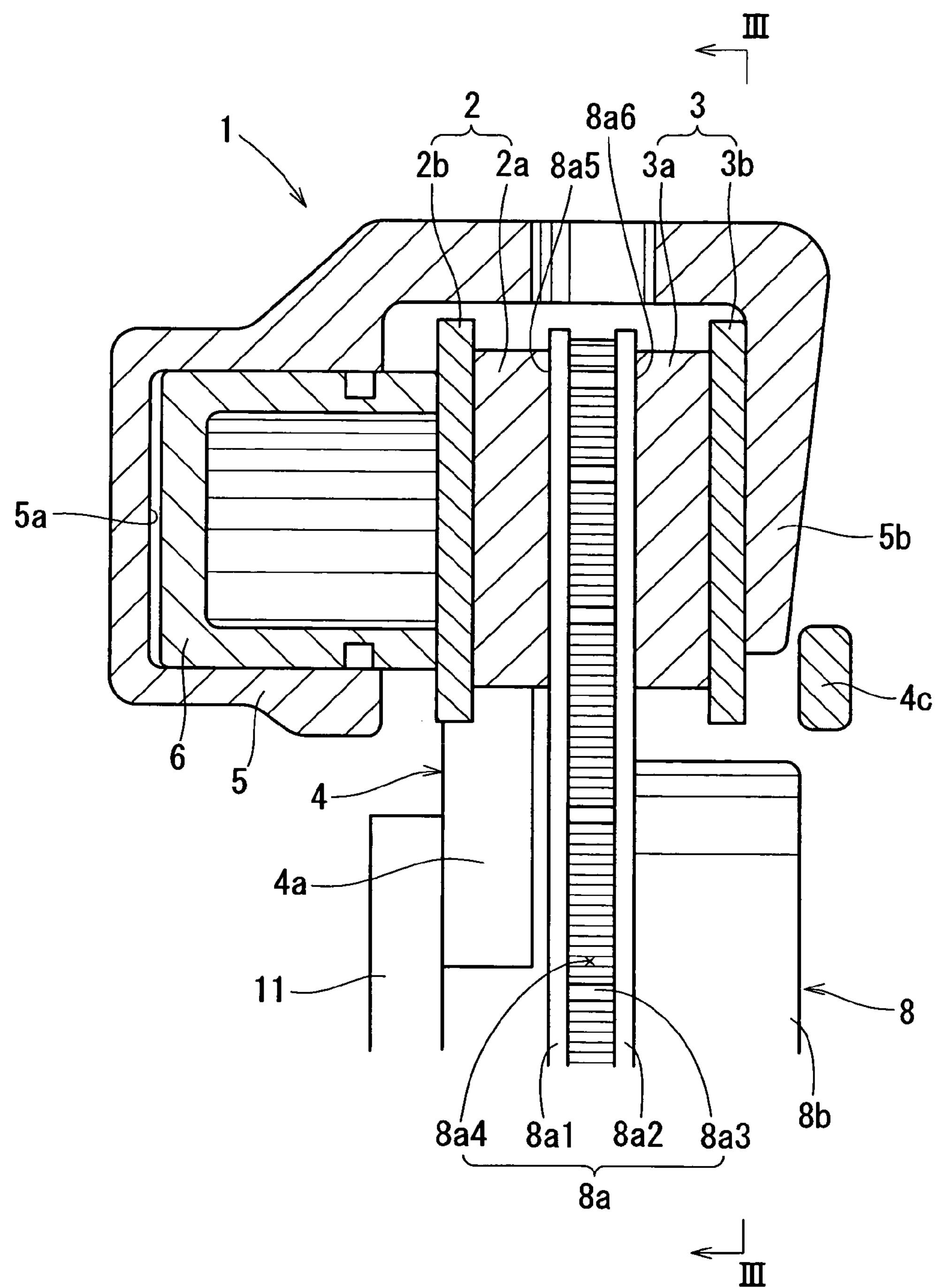
FIG. 2 is a cross-sectional view taken along line II-II of FIG. 1.
Figure 3:
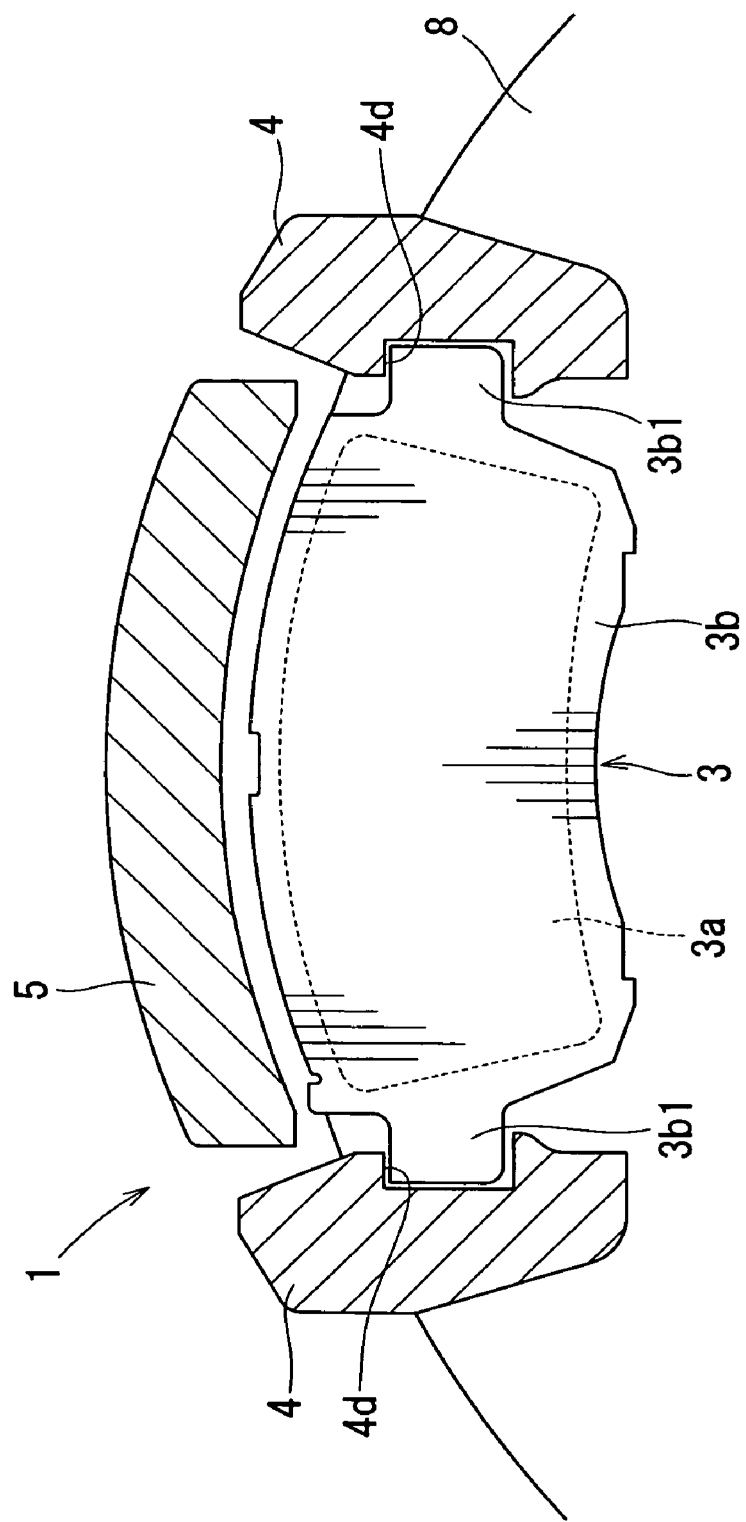
FIG. 3 is a cross-sectional view taken along line III-III of FIG. 2.

The first representative embodiment will now be described with reference to FIGS. 1 to 3. As shown in FIG. 1 and FIG. 2, a disk brake 1 has a disk rotor 8, and a pair of pads (an inner pad 2 and an outer pad 3) each pressed toward the disk rotor 8.

The disk brake 1 may be a floating-type disk brake and have a mounting 4 (support member) mounted to a car body side member 11 and a caliper 5 movably supported on the mounting 4.

The disk rotor 8 may be a ventilated-type disk rotor as shown in FIG. 1 and FIG. 2, and have a disk part **8*a* and an attachment part 8*b* (i.e., hat part). The disk part 8*a* may have an inner plate 8*a*1 located in an opposing manner with an outer plate 8*a*2. The inner plate 8*a*1 and the outer plate 8*a*2** are formed in a disk shape.

The inner plate **8*a*1 is arranged at the car body side (i.e., the inner or left side as shown in FIG. 2) and has an inner surface 8*a*5 formed in a circular disk shape. The outer plate 8*a*2 is arranged to the outside of the car body (i.e., outer side), and has an outer surface 8*a*6 formed in a circular disk shape. A plurality of blades 8*a*3 is provided between the inner plate 8*a*1 and the outer plate 8*a*2**.

The blades **8*a*3 are provided at predetermined intervals and radially extend from an inner circumferential edge to an outer circumferential edge of the disk part 8*a*. As a result, a plurality of ventilation flues 8*a*4 are formed that radially extend between the inner plate 8*a*1 and the outer plate 8*a*2**.

The blades **8*a*3 are constructed so as to perform a pumping function in order to increase the wind velocity in the ventilation flues 8*a*4 when the disk rotor 8 is rotated. Moreover, the blades 8*a*3 are constructed to also have a high heat transfer property. Therefore the blades 8*a*3 may easily heat up due to the frictional heat generated on the surfaces of the inner plate 8*a*1 and the outer plate 8*a*2. Accordingly, the cooling air flowing through the ventilation flues 8*a*4 can help the blades 8*a*3** to efficiently radiate the generated frictional heat.

The attachment part **8*b* has a cylindrical connection 8*b*1 and a disk-like flange 8*b*2 as shown in FIG. 1. Attachment holes 8*b*3 are formed in the flange 8*b*2. Stud bolts are provided on a wheel hub and are inserted into the attachment holes 8*b*3. Consequently, the disk rotor 8 is fixed to the wheel hub via the flange 8*b*2**.

The mounting 4 (support member) has an attachment **4*a* mounted to a car body side member 11, as shown in FIG. 2. The attachment 4*a* is fixed to the car body side member 11 at a side near the car body with respect to the disk rotor 8. The mounting 4 is in the shape of a frame, as shown in FIG. 1, and includes a pair of straddling parts 4*b*, straddling the disk rotor 8 in a rotor axis direction, and a connection 4*c* for connecting between the ends of the pair of straddling parts 4*b*. Accordingly, the mounting 4 is supported on the car body side member 11** in a cantilever type of manner.

The caliper 5 is slidably attached to the mounting 4 in the rotor axis direction by a pair of slide pins 7, as shown in FIG. 1. The caliper 5 extends in the rotor axis direction between the pair of straddling parts **4*b* and straddles the disk rotor 8 to the exterior of the outer circumference of the disk rotor 8. Furthermore, the caliper 5 has a claw 5*b* overhanging to the backside (i.e., to the outside of the car body) of the outer pad 3 at an extending end, as shown in FIG. 2**.

A cylinder **5*a* is formed at an inner side (i.e., the car body side) of the caliper 5, and a piston 6 is arranged within the cylinder 5*a*. The piston 6 is constructed so as to slide in the rotor axis direction due to fluid pressure within the cylinder 5*a* and press the inner pad 2 toward the disk rotor 8**.

When the piston 6 presses the inner pad 2 against the inner surface **8*a*5 of the disk rotor 8, the caliper 5 receives a reaction force via the piston 6. Thus, the caliper 5 moves to the car body side (i.e., left as viewed in FIG. 2). The claw 5*b* of the caliper 5 presses the outer pad 3 against an outer surface 8*a*6 of the disk rotor 8. In this way, the pair of pads (2, 3) is pressed against the disk rotor 8**, generating a braking force.

The inner pad 2 is supported by the mounting 4 at a side near the car body with respect to the disk rotor 8, as shown in FIG. 2. On the other hand, the outer pad 3 is supported by the mounting 4 at an outer side of the car body with respect to the disk rotor 8. Both the inner pad 2 and the outer pad 3 have friction members **2*a* and 3*a*, and backing plates 2*b* and 3*b***.

The backing plates **2*b* and 3*b* are respectively attached to the backsides of the friction members 2*a* and 3*a*. In addition, the backing plates 2*b* and 3*b* are constructed to support the friction members 2*a* and 3*a* from the backsides. The backing plate 3*b* has ears 3*b*1 as shown in FIG. 3. Ears 3*b*1 project along a rotor circumference direction at both edges (determined in the rotor circumference direction) of the backing plate 3*b***.

The mounting 4 has a pair of guides **4*d*. The guides 4*d* are recessed and movably support the ears 3*b*1 in the rotor axis direction. Similarly, the backing plate 2*b* of the inner pad 2 also has ears and a corresponding set of guides formed in the mounting 4, movably supporting the ears in the rotor axis direction (the ears and guides of inner pad 2 are not shown but substantially correspond to the components of the outer pad 3 shown in FIG. 3**).

The friction members **2*a* and 3*a* generate a friction force by being abraded against the disk rotor 8. The friction members 2*a* and 3*a*** are formed containing base fibers, a friction conditioner (filler), and a binder as main components. Inorganic fibers and organic fibers can be appropriately selected for the fiber base.

The friction conditioner is contained for the regulation of the friction coefficient, suppressing unusual noise, and anti-corrosion properties. Inorganic filler, organic filler, and a lubricant, can be appropriately selected for the friction conditioner.

For the inorganic fillers, abrasive, barium sulfate, calcium carbonate, calcium hydroxide, mica, kaolin, and talc, can be appropriately selected. Cashew dust or rubber dust can be used for the organic fillers, and graphite, antimony trisulfide, molybdenum disulfide, and zinc disulfide, can be used for the lubricant.

The friction member **3*a* of the outer pad 3 is configured to have a smaller friction coefficient than the friction coefficient of the friction member 2*a* of the inner pad 2 by adjusting the blended amount of the friction conditioner. Preferably, the friction member 3*a* is adjusted such that the friction coefficient of the outer pad 3 is at least 7% smaller than the friction coefficient of the inner pad 2. More preferably, the friction coefficient of the outer pad 3 is adjusted such that it is at least 14% smaller than that of the inner pad 2**.

The friction member **2*a* and the friction member 3*a* are constructed to have the same general configuration and have the same size of abrasion area contacting against the disk rotor 8. However with regard to the disk rotor 8, the inner plate 8*a*1 and the outer plate 8*a*2 may be formed from the same material. Additionally, the inner surface 8*a*5 may have the same friction coefficient as the friction coefficient of the outer surface 8*a*6**.

(Experiment)

An experiment comparing the generation of unusual noise was conducted on disk brakes configured according to the embodiment and other disk brakes not configured according to the embodiment. The method and results of the experiment are described below.

Initially, pads were prepared comprising friction members having different friction coefficients (Table 1). Pads were used having the same shape and the same size of abrasion area.

The pads were then used one by one for the outer pad location and the inner pad location. Various combinations of disk brakes were thereby constructed (Table 2). The experiment regarding the generation of unusual noise was then conducted for the various configurations of disk brakes. Disk brakes constructed according to the invention's embodiment are marked with an INV in the rightmost column of Table 2. FC in Table 2 stands for friction coefficient. The difference between the outer FC and the inner FC in Table 2 is the result of a calculation subtracting the outer FC from the inner FC. In the method of the experiment regarding the generation of unusual noise, the pads were subjected to 10 brake tests from 50 km/h to 0 km/h at 4 $m/s^2$ under the condition of a temperature of 100° C. or less. Unusual noises generated at that time were evaluated using the evaluation criterion shown in Table 3. The evaluation results were tabulated in Table 2.

TABLE 1

| Pad | Friction Coefficient |
|---|---|
| Material A | 0.37 |
| Material B | 0.30 |
| Material C | 0.34 |
| Material D | 0.40 |
| Material E | 0.43 |

TABLE 2

| | Outer Plate | | Inner Plate | | Difference between the outer FC and the inner FC | The outer FC divided by the inner FC | Evaluation result of the unusual noise | Invention Embodiment |
|---|---|---|---|---|---|---|---|---|
| | Material | FC | Material | FC | | | | |
| 1 | A | 0.37 | A | 0.37 | 0 | 1.00 | 3 | |
| 2 | B | 0.30 | A | 0.37 | 0.07 | 0.81 | 1 | INV |
| 3 | C | 0.34 | A | 0.37 | 0.03 | 0.92 | 2 | INV |
| 4 | D | 0.40 | A | 0.37 | −0.03 | 1.08 | 3 | |
| 5 | E | 0.43 | A | 0.37 | −0.06 | 1.16 | 4 | |
| 6 | A | 0.37 | B | 0.30 | −0.07 | 1.23 | 4 | |
| 7 | B | 0.30 | B | 0.30 | 0 | 1.00 | 3 | |
| 8 | C | 0.34 | B | 0.30 | −0.04 | 1.13 | 4 | |
| 9 | D | 0.40 | B | 0.30 | −0.10 | 1.33 | 4 | |
| 10 | E | 0.43 | B | 0.30 | −0.13 | 1.43 | 4 | |
| 11 | A | 0.37 | C | 0.34 | −0.03 | 1.09 | 3 | |
| 12 | B | 0.30 | C | 0.34 | 0.04 | 0.88 | 2 | |
| 13 | C | 0.34 | C | 0.34 | 0 | 1.00 | 3 | |
| 14 | D | 0.40 | C | 0.34 | −0.06 | 1.18 | 4 | |
| 15 | E | 0.43 | C | 0.34 | −0.09 | 1.26 | 4 | |

TABLE 2-continued

| | Outer Plate | | Inner Plate | | Difference between the outer FC and | The outer FC divided by the | Evaluation result of the | Invention |
|---|---|---|---|---|---|---|---|---|
| | Material | FC | Material | FC | the inner FC | inner FC | unusual noise | Embodiment |
| 16 | A | 0.37 | D | 0.40 | 0.03 | 0.93 | 2 | INV |
| 17 | B | 0.30 | D | 0.40 | 0.10 | 0.75 | 1 | INV |
| 18 | C | 0.34 | D | 0.40 | 0.06 | 0.85 | 1 | INV |
| 19 | D | 0.40 | D | 0.40 | 0 | 1.00 | 3 | |
| 20 | E | 0.43 | D | 0.40 | −0.03 | 1.08 | 3 | |
| 21 | A | 0.37 | E | 0.43 | 0.06 | 0.86 | 1 | INV |
| 22 | B | 0.30 | E | 0.43 | 0.13 | 0.70 | 1 | INV |
| 23 | C | 0.34 | E | 0.43 | 0.09 | 0.79 | 1 | INV |
| 24 | D | 0.40 | E | 0.43 | 0.03 | 0.93 | 2 | INV |
| 25 | E | 0.43 | E | 0.43 | 0 | 1.00 | 3 | |

TABLE 3

| Evaluation Criterion of Unusual Noise | | Evaluation Decision |
|---|---|---|
| 4 | Excessively audible | NG (No Good) |
| 3 | Readily audible | NG (No Good) |
| 2 | Slightly audible | Acceptable |
| 1 | Non audible | Most Acceptable |

The experimental results demonstrated that for the disk brakes constructed according to the teachings of the embodiment (i.e., those marked INV in the rightmost column in Table 2), that is, for the disk brakes in which the friction coefficient of the outer pad was smaller than the friction coefficient of the inner pad, a good result of “slightly audible” or “non audible” was obtained.

In particular, it was determined that a good result was obtained for the configurations where the friction coefficient of the outer pad was at least 7% smaller than that of the inner pad. Moreover, the best result of “non audible” was obtained for a configuration where the friction coefficient of the outer pad was at least 14% smaller than the friction coefficient of the inner pad.

The disk brake 1 was formed in a way as detailed hereinabove. That is, the outer pad 3 was formed from a material having a smaller friction coefficient than that of the inner pad 2. As a result, the brake torque generated between the outer pad 3 and the disk rotor 8 is smaller than the brake torque generated between the inner pad 2 and the disk rotor 8 (refer to FIG. 2).

It was shown from the experimental results that an unusual noise of the brake could be effectively suppressed according to the said construction.

While the reasoning behind the ability to suppress the unusual noise by the described configuration of the embodiment is currently not clearly identified, one possible rationale is considered to function as follows. Specifically, the mounting 4 (support member) is constructed in a cantilever manner so that the mounting is easily displaced due to a vibration of the outer pad 3, supported at the tip end side of the mounting. However, in the embodiment shown, since the friction coefficient of the outer pad 3 is smaller than the friction coefficient of the inner pad 2, the vibration on the side of the outer pad 3 is reduced. Therefore displacement of the mounting 4 is also reduced.

In addition, the inner pad 2 has a higher friction coefficient than the friction coefficient of the outer pad 3. As a result, the inner pad 2 generally suppresses the displacement of the mounting 4. Thereby unusual noise of the brake generated at a high decelerating speed can be suppressed.

Second Representative Embodiment

The second representative embodiment is configured approximately similar to the first representative embodiment. However, according to the second representative embodiment the outer pad and the inner pad may be constructed to have the same friction coefficient. Instead of different friction coefficients for the pads, the disk rotor may be constructed to have a smaller friction coefficient on an outer surface than the friction coefficient on the inner surface.

A configuration in which the friction coefficient of the outer surface of the disk rotor is smaller than the friction coefficient of the inner surface may include a configuration where the material of the inner plate is different from the material of the outer plate. Specifically, a configuration may be provided where the carbon content of an outer plate made of cast iron is increased as compared with the carbon content of an inner plate made of cast iron. Alternatively, a configuration may be provided in which an outer plate is relatively harder than an inner plate by having an outer plate formed using a cast iron material with an added alloying element and an inner plate formed using a cast iron material without the added alloying element. In addition, a configuration may be provided wherein an outer plate is formed using carbon steel and subjected to heat treatment in order to harden, and an inner plate is formed of cast iron.

(Experiment)

An experiment regarding the generation of unusual noise was conducted using disk brakes according to the embodiment and for comparison, other disk brakes not according to the embodiment. The method and results of the experiment are described below.

Initially, plates were prepared having different friction coefficients (Table 4). The letter ‘a’ indicates a plate made of cast iron. The letter ‘b’ indicates a plate made of cast iron with an added alloying element. The letter ‘c’ indicates a plate made of carbon rich cast iron, which is richer in carbon than the ‘a’ plates. The letter ‘d’ indicates a plate that was formed using carbon steel and then subjected to heat treatment.

The plates were then used one by one as an outer plate and an inner plate. Various configurations of disk brakes were thereby constructed (Table 5). The experiment regarding the generation of unusual noise was conducted for the various configurations of the disk brakes. Disk brakes constructed according to the embodiments of the invention are marked INV in the rightmost column of Table 5.

Material A (as identified in Table 1) was used for the friction members of the outer pad and the inner pad. In addition, outer pads and inner pads were used having the same configuration and same size of abrasion area. The method of the experiment testing the generation of the unusual noise is the same as the method used with the first experiment. The generation of unusual noise was evaluated using the evaluation criterion listed in Table 3. The evaluation results were tabulated in Table 5.

TABLE 4

| | Plate material of Disk Rotor | Friction Coefficient |
|---|---|---|
| a | Plate formed of cast iron | 0.37 |
| b | Plate formed of cast iron with an added alloying element | 0.33 |
| c | Plate formed of carbon rich cast iron | 0.32 |
| d | Plate formed of carbon steel and heat treated | 0.31 |

TABLE 5

| | Outer Plate of Disk rotor | | Inner Plate of Disk rotor | | Difference between the outer FC and | The outer FC divided by | Evaluation Results of the | Invention |
|---|---|---|---|---|---|---|---|---|
| | Material | FC | Material | FC | the inner FC | the inner FC | Unusual Noise | Embodiment |
| 1 | a | 0.37 | a | 0.37 | 0 | 1.00 | 3 | |
| 2 | b | 0.33 | a | 0.37 | 0.04 | 0.89 | 2 | INV |
| 3 | c | 0.32 | a | 0.37 | 0.05 | 0.86 | 1 | INV |
| 4 | d | 0.31 | a | 0.37 | 0.06 | 0.84 | 1 | INV |
| 5 | a | 0.37 | b | 0.33 | −0.04 | 1.12 | 4 | |
| 6 | b | 0.33 | b | 0.33 | 0 | 1.00 | 3 | |
| 7 | c | 0.32 | b | 0.33 | 0.01 | 0.97 | 3 | INV |
| 8 | d | 0.31 | b | 0.33 | 0.02 | 0.94 | 3 | INV |
| 9 | a | 0.37 | c | 0.32 | −0.05 | 1.16 | 4 | |
| 10 | b | 0.33 | c | 0.32 | −0.01 | 1.03 | 3 | |
| 11 | c | 0.32 | c | 0.32 | 0 | 1.00 | 3 | |
| 12 | d | 0.31 | c | 0.32 | 0.01 | 0.97 | 3 | INV |
| 13 | a | 0.37 | d | 0.31 | −0.06 | 1.19 | 4 | |
| 14 | b | 0.33 | d | 0.31 | −0.02 | 1.06 | 3 | |
| 15 | c | 0.32 | d | 0.31 | −0.01 | 1.03 | 3 | |
| 16 | d | 0.31 | d | 0.31 | 0 | 1.00 | 3 | |

The experimental results demonstrated that for the disk brakes configured according to the embodiment (those marked INV in the rightmost column in Table 5), that is, in the disk brakes in which the friction coefficient of the outer surface of the disk rotor was smaller than the friction coefficient of the inner surface, in most cases a good result of "slightly audible" or "non audible" was obtained. In particular, it was determined that good results were obtained with a configuration in which the friction coefficient of the outer surface was at least 10% smaller than the friction coefficient of the inner surface.

The second representative embodiment was configured in a way as described hereinabove. Thus, the disk rotor has an outer surface to which the outer pad is pressed and an inner surface to which the inner pad is pressed. The outer surface has a smaller friction coefficient than the friction coefficient of the inner surface. In addition, the brake torque generated between the outer surface and the outer pad is smaller than the brake torque generated between the inner surface and the inner pad.

The experimental results demonstrated that the generation of unusual noises by the brake could be effectively suppressed according to the said construction.

While the mechanism of suppressing the unusual sound is currently not identified, one possibility may be considered to function as follows. The support member is constructed in a cantilever manner allowing the support member to be easily displaced due to the vibrations of the outer pad supported at the tip end side of the member. However, in this invention the outer pad slides more easily along the outer surface of the disk rotor than does the inner pad contacting the inner surface of the disk rotor. Therefore, generated vibration is reduced between the outer surface and the outer pad. Consequently, displacement of the support member is also reduced. In addition, the inner surface of the disk rotor has a larger friction coefficient than the friction coefficient of the outer surface. Therefore, the inner pad contacting the inner surface of the disk rotor can more effectively suppress the displacement of the support member.

As a result, the displacement of the support member is generally suppressed. Thereby the unusual noise of the brake generated at a high decelerating speed can be suppressed.

Other Possible Embodiments

The invention is not limited to the first and second representative embodiments, which are presented as examples of the teachings of the invention. In addition, the invention can be configured as the following embodiments among others, such as, for example, combinations of various components of the embodiments.

(1) The disk rotors according to the first and second representative embodiments were described as a ventilated-type disk rotor having ventilation flues. However, a solid-type disk rotor may be used without ventilation flues. The plate part may be formed as a one-plate structure, or as a laminated structure in which the inner plate and the outer plate are laminated together.

(2) The first representative embodiment was described as configured in a way that the outer and inner surfaces of the disk rotor had substantially the same friction coefficient, and the outer and inner pads had different friction coefficients. In addition, the second representative embodiment was described as configured in a way that the outer and inner surfaces of the disk rotor had different friction coefficients, and the outer and inner pads had substantially the same friction coefficient. However, a configuration may be used in which the generated frictional force between the outer surface and the outer pad is smaller than the friction force generated between the inner surface and the inner pad. For example, a configuration may be used where the outer and inner surfaces of the disk rotor have different friction coefficients, and the outer and inner pads also have different friction coefficients. More specifically, a configuration may be used that corresponds to a combination of the first representative embodiment and the second representative embodiment.

(3) The disk brakes according to the first and second representative embodiments were described as floating-type disk brakes. However, the disk brake may also be a piston-opposed type of disk brake. More specifically, a disk brake may be used that has a caliper (support member) that is mounted on a car body side member on a side near the car body with respect to the disk rotor and straddles the disk rotor in a cantilever manner in the rotor axis direction, an inner pad movably supported in the rotor axis direction against the caliper at a side near the car body with respect to the disk rotor, and an outer pad movably supported in the rotor axis direction against the caliper at an outer side of the car body with respect to the disk. In this type of configuration approximately the same effects can be obtained as in the first and second representative embodiments.

This invention claims:

1. A disk brake (1) comprising:

a disk rotor (8);

a support member (4) that is mounted on a car body member (11) at a side near a car body with respect to the disk rotor (8) and straddles the disk rotor (8) in a rotor axis direction;

an inner pad (2) movably supported in the rotor axis direction by the support member (4) at a side near the car body with respect to the disk rotor (8);

an outer pad (3) movably supported in the rotor axis direction by the support member (4) at an outer side of the car body with respect to the disk rotor (8);

wherein the outer pad (3) has an outer pad friction coefficient less than an inner pad friction coefficient of the inner pad (2), and an outer braking torque generated between the outer pad (3) and the disk rotor (8) is less than an inner braking torque generated between the inner pad (2) and the disk rotor (8); and wherein the outer pad friction coefficient of the outer pad (3) is at least 7% smaller than the inner pad friction coefficient of the inner pad (2).

2. The disk brake (1) as in claim 1, wherein the outer pad friction coefficient of the outer pad (3) is at least 14% smaller than the inner pad friction coefficient of the inner pad (2).

3. A disk brake (1) comprising:

a disk rotor (8);

a support member (4) that is mounted on a car body member (11) at a side near a car body with respect to the disk rotor (8) and straddles the disk rotor (8) in a rotor axis direction;

an inner pad (2) movably supported in the rotor axis direction by the support member (4) at a side near the car body with respect to the disk rotor (8); and an outer pad (3) movably supported in the rotor axis direction by the support member (4) at an outer side of the car body with respect to the disk rotor (8);

wherein the disk rotor (8) has an outer surface (8*a*6) which slidingly contacts the outer pad (3) and an inner surface (8*a*5) which slidingly contacts the inner pad (2);

the outer surface (8*a*6) has a smaller outer surface friction coefficient than an inner surface friction coefficient of the inner surface (8*a*5), and an outer braking torque generated between the outer surface (8*a*6) and the outer pad (3) is smaller than an inner braking torque generated between the inner surface (8*a*5) and the inner pad (2); and wherein the outer surface friction coefficient of the disk rotor's outer surface (8*a*6) is at least 10% smaller than the inner surface friction coefficient of the disk rotor's inner surface (8*a*5).

* * * * *